June 2, 1970 W. C. HUTTON ET AL 3,516,060

ANALOG COMPARATOR

Filed Oct. 21, 1965 8 Sheets-Sheet 1

INVENTORS
WILLIAM C. HUTTON
ROBERT C. REIBOLD
BY
Dock N. Jeu
AGENT

INVENTORS
WILLIAM C. HUTTON
ROBERT C. REIBOLD
BY
Dock N. Jeu
-AGENT-

INVENTORS
WILLIAM C. HUTTON
ROBERT C. REIBOLD
BY
Dock N. Jeu
AGENT

ANALOG COMPARATOR

Filed Oct. 21, 1965

INVENTORS
WILLIAM C. HUTTON
ROBERT C. REIBOLD
BY
[signature]
-AGENT-

ANALOG COMPARATOR

Filed Oct. 21, 1965 8 Sheets-Sheet 5

INVENTORS
WILLIAM C. HUTTON
ROBERT C. REIBOLD
BY
Dock N. Jeu
-AGENT-

ANALOG COMPARATOR

Filed Oct. 21, 1965 8 Sheets-Sheet 6

INVENTORS
WILLIAM C. HUTTON
ROBERT C. REIBOLD
BY
Dock N. Jeu
-AGENT-

INVENTORS
WILLIAM C. HUTTON
ROBERT C. REIBOLD
BY
Dock M. Jeu
-AGENT-

INVENTORS
WILLIAM C. HUTTON
ROBERT C. REIBOLD
BY
Dodd N. Jeu
AGENT.

3,516,060
ANALOG COMPARATOR

William C. Hutton and Robert C. Reibold, Garden Grove, Calif., assignors, by mesne assignments, to McDonnell Douglas Corporation, Santa Monica, Calif., a corporation of Maryland Filed Oct. 21, 1965, Ser. No. 499,857
Int. Cl. G08c *13/00*
U.S. Cl. 340—149 10 Claims

ABSTRACT OF THE DISCLOSURE

An analog comparator including a first integrator for producing a first integrated output signal from a first input signal, a second integrator for producing a second integrated output signal from a second input signal, a differential amplifier for producing a differential output signal from the first and second output signals, a threshold detector responsive to a predetermined level of the first output signal and producing a sample signal therefrom, and means responsive to the sample signal for sampling the differential output signal and comparing it with a tolerance signal. A modified, economical version of the analog comparator is also disclosed.

This invention relates generally to automatic comparison systems. More particularly, the invention relates to an automatic comparison system including an analog comparator for comparing the test response signal from a test unit, subjected to a selected stimulus signal, with the optimum or reference response signal from a standard unit which was subjected to the same stimulus signal. An automatic comparison system which utilizes this analog comparator is shown, described and claimed in the related and copending patent application of Herbert L. McCoy, Ser. No. 500,417 filed on Oct. 21, 1965 for Automatic Comparison System.

It is an object of this invention to provide an automatic test system for testing electronic equipment by a comparison method wherein extremely reliable determinations can be made regarding the quality of the tested units.

Another object of the invention is to provide automatic testing means for testing equipment in a comprehensive manner whereby transient failures or faults can be readily detected.

Another object of the invention is to provide automatic testing means capable of testing electronic equipment in a comprehensive manner and yielding a go, no go indication to show the results of the evaluation of a tested unit as to whether it is satisfactory in performance within certain selected tolerances.

A further object of this invention is to provide analog signal comparator means wherein a comparison can be made rapidly and continuously between two steady-state or complex analog signals to determine differences in signal amplitude and signal time displacement.

A still further object of the invention is to provide analog signal comparator means for comparing a dynamic or static test signal with a dynamic or static reference signal to determine signal differences in terms of percentage error of the test signal with respect to the reference signal.

Yet another object of this invention is the provision of automatic testing means for rapidly testing one or more components in a test unit wherein such components are subjected to a wide variety of stimulus signals to determine the acceptability of their responses to the stimulus signals.

Other objects and features of this invention will become apparent from the following description of the invention as considered with reference to the accompanying drawings, in which:

FIG. 3 is a circuit diagram of the analog comparison system;

Figure 7A:
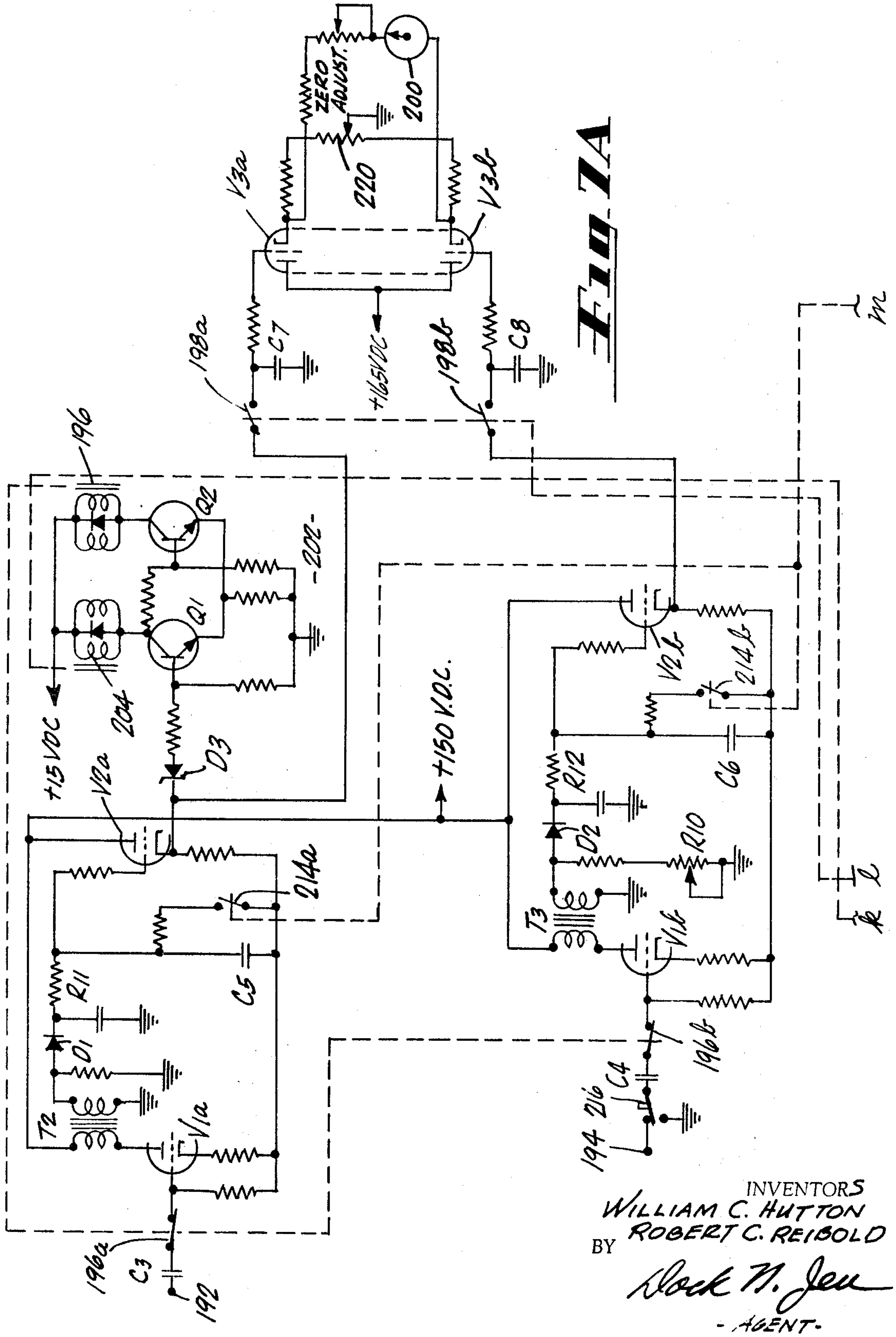
Figure 7B:
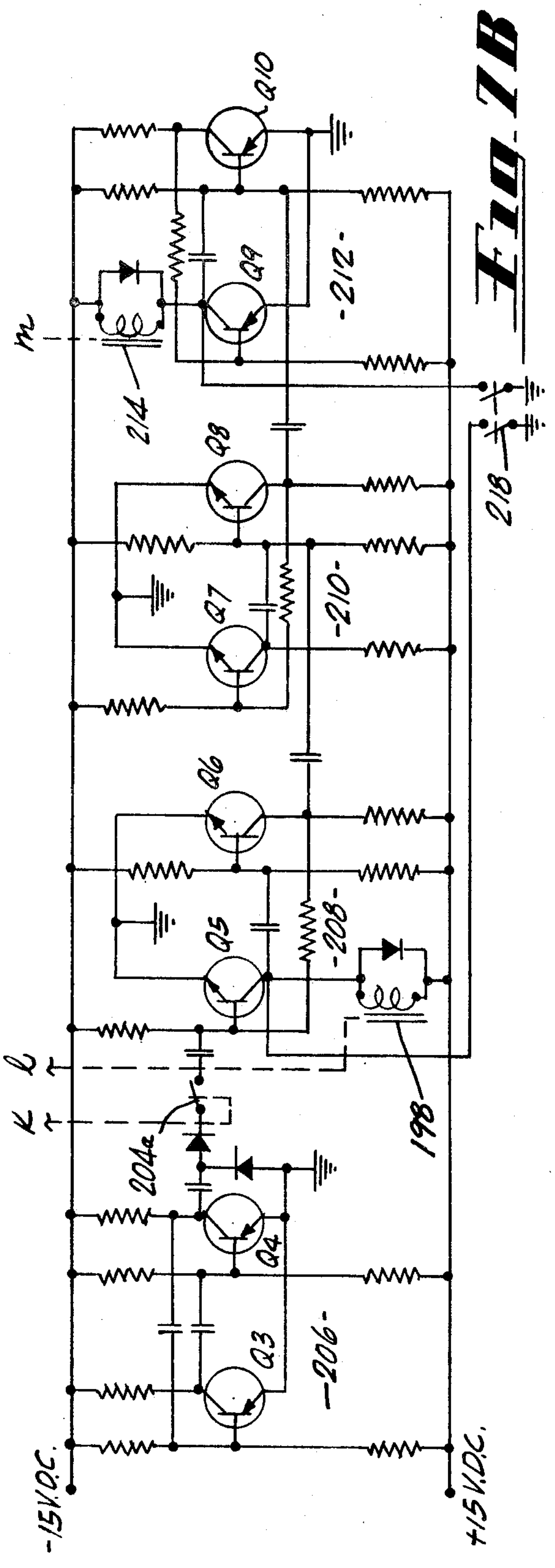
Figure 8:
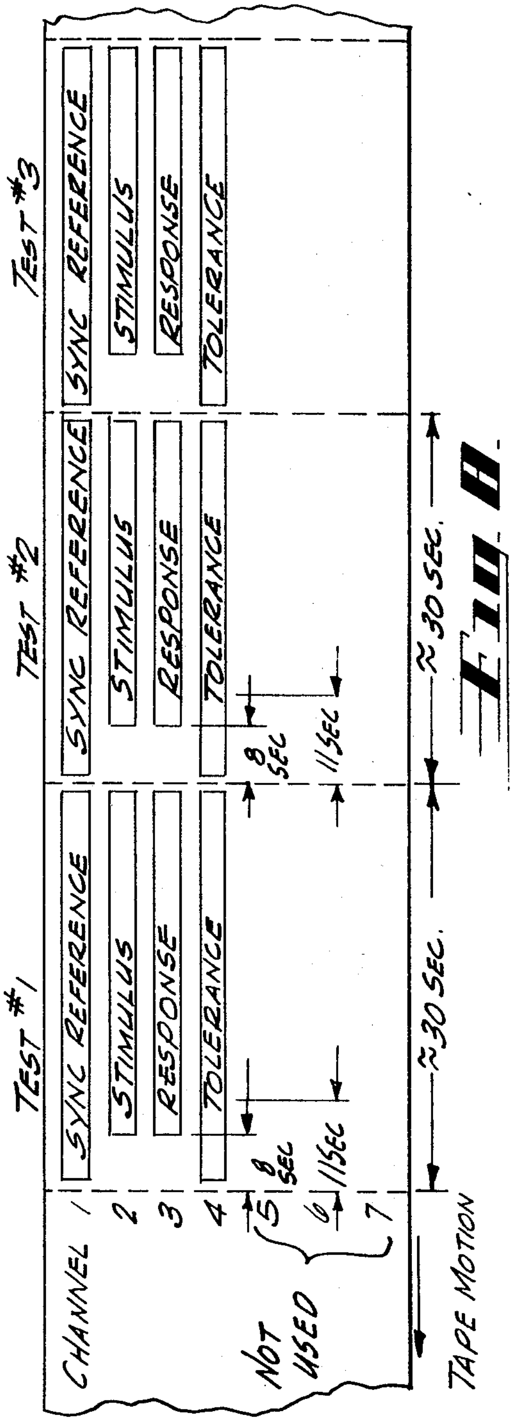

FIGS. 6A, 6B, 6C and 6D, together, comprise a complete circuit diagram of an illustrative embodiment of the analog comparator;

FIGS. 7A and 7B, together, comprise a circuit diagram of another version of the analog comparator; and FIG. 8 is a graph diagrammatically showing the different signals that are recorded on tape and their relative starting points and durations.

Figure 1:
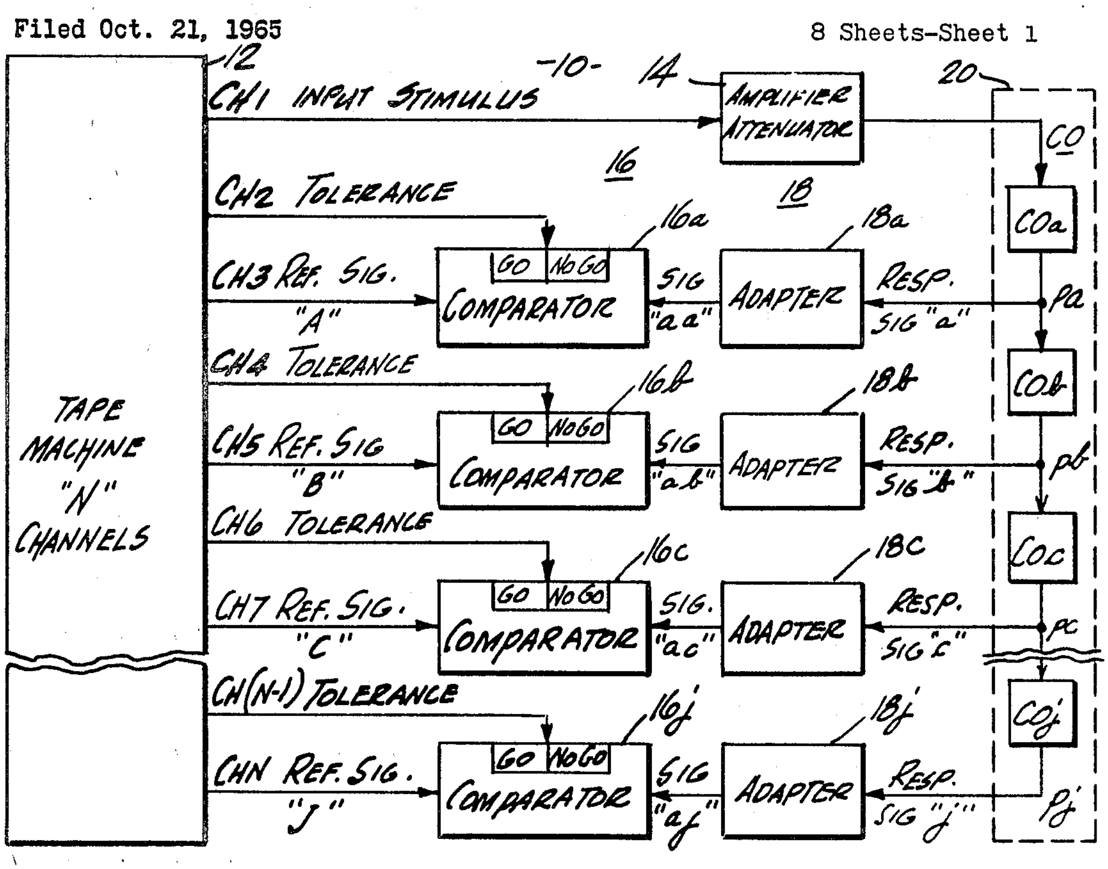
FIG. 1 is a block diagram of an analog comparison system showing the connection of various elements in the playback phase of operation.

FIG. 1 is a block diagram of an analog comparison system 10 broadly illustrating one embodiment of this invention. The system 10 generally includes, for example, a multiple channel tape machine 12, an amplifier-attenuator 14, a plurality of comparators 16 and a plurality of adapters 18 which are adapted to receive respective test response signals from corresponding components CO of unit 20 that is under test. The system 10 is, of course, only broadly shown here, and incidental or auxiliary details have been omitted for purposes of clarity and such details will be shown and/or described later.

The system 10 is depicted in the test phase in FIG. 1. The tape machine 12 then serves as a playback device and produces output signals on its channels CH1, CH2, CH3 . . . CH(N–1) and CHN. As indicated, an input stimulus signal provided through the amplifier-attenuator 14 to the components CO of the test unit 20 is produced on the channel CH1, tolerance signals to the comparators 16 are produced on their respective channels CH2, CH4, CH6 . . . CH(N–1), and reference signals A, B, C . . . J are produced on their respective channels CH3, CH5, CH7 . . . CHN.

The tape machine 12 preferably includes frequency modulation circuitry or other circuitry which permits the effective recording and reproduction of direct current or low frequency signals as well as much higher frequency signals. The input stimulus signal on channel CH1 is applied through the amplifier-attenuator 14 to component CO*a* of the test unit 20 as shown in FIG. 1. The components CO*a*, CO*b*, CO*c* . . . CO*j* are illustrated in this instance as being connected in series so that while the input stimulus signal on channel CH1 is only applied after amplification or attenuation directly to the component CO*a*, the signal is also applied indirectly to the other series components CO*b*, CO*c* . . . CO*j* in this particular example of one form of the test unit 20.

The tolerance signals on their respective channels CH2, CH4, CH6 . . . CH(N–1) are applied to corresponding comparators **16*a*, 16*b*, 16*c* . . . 16*j* which are each of a go, no go configuration. Tolerances are, for example, determined statistically from other units similar to the test unit 20 and which are known to be operating properly. The reference signals "A," "B," "C" . . . "J" on their respective channels CH3, CH5, CH7 . . . CHN are applied to the corresponding comparators 16*a*, 16*b*, 16*c* . . . 16*j*** as indicated in FIG. 1.

The amplified or attenuated input stimulus signal on channel CH1 to component CO*a* produces a test response signal "*a*" at the output *pa* of the component CO*a*. This response signal "*a*" is fed to adapter 18*a* which adapts the signal "*a*" so that it is suitable for application to the comparator 16*a*. Adapted signal "*aa*" to the comparator 16*a* is, of course, compared with the reference signal "A" and according to whether the signal difference is either within or outside of the tolerance established by the tolerance signal on channel CH2, a "go" or "no go" indication and/or signal will be produced by the comparator 16*a*.

The output signal from the component CO*a* of the test unit 20 is applied to the component CO*b* which produces a test response signal "*b*" from its output *pb*. This response signal "*b*" is fed to adapter 18*b* which adapts the signal "*b*" so that it is suitable for application to the comparator 16*b*. Adapted signal "*ab*" to the comparator 16*b* is, of course, compared with the reference signal "B" and, as described before with respect to the comparator 16*a*, a "go" or "no go" indication and/or signal will be produced by the comparator 16*b* according to whether the signal difference between the adapted response signal "*ab*" and the reference signal "B" is either within or outside of the tolerance established by the tolerance signal on channel CH4.

In like manner, the outputs *pc* . . . *pj* of the components CO*c* . . . CO*j* produce response signals "*c*" . . . "*j*" which are fed to their respective adapters 18*c* . . . 18*j* to provide suitably adapted response signals "*ac*" . . . "*aj*" which are applied to the corresponding comparators 16*c* . . . 16*j*. The adapted response signals "*ac*" . . . "*aj*" are compared with their respective reference signals "C" . . . "J" and, according to whether the signal differences between the compared signals are within or outside of the tolerances established by the corresponding tolerance signals on channels CH6 . . . CH(N–1), the comparators 16*c* . . . 16*j* will each produce either a "*go*" or "no go" indication and/or signal.

Figure 2:
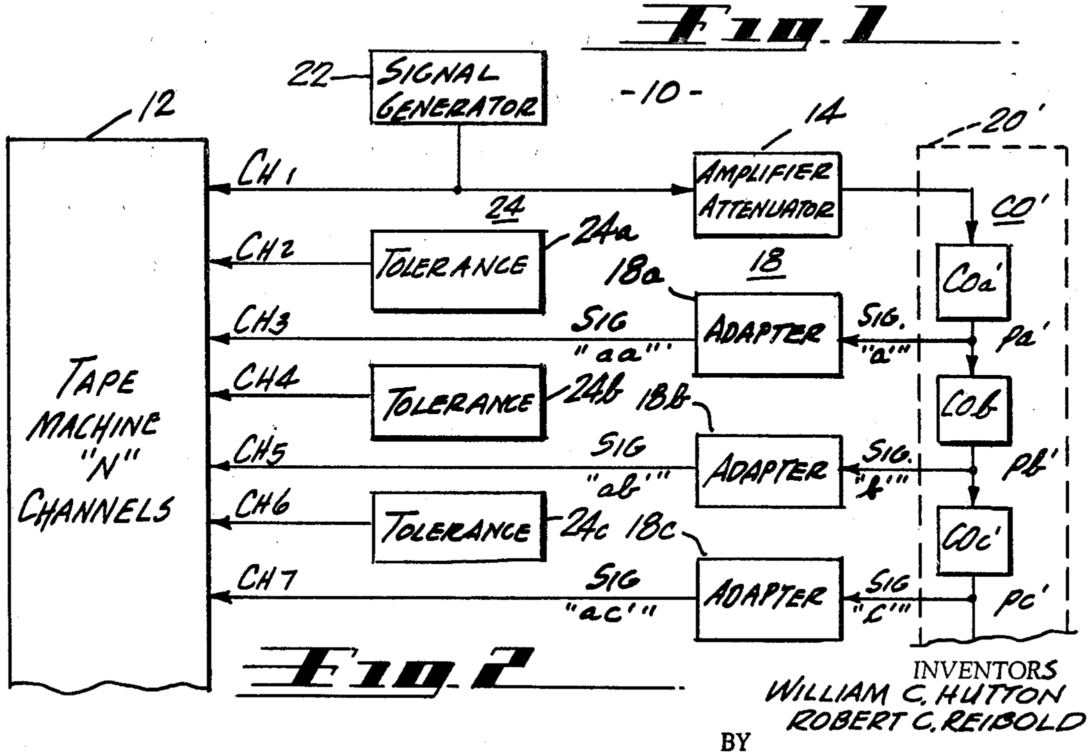
FIG. 2 is a block diagram of the analog comparison system showing various elements connected in the record phase of operation.
Figure 2:
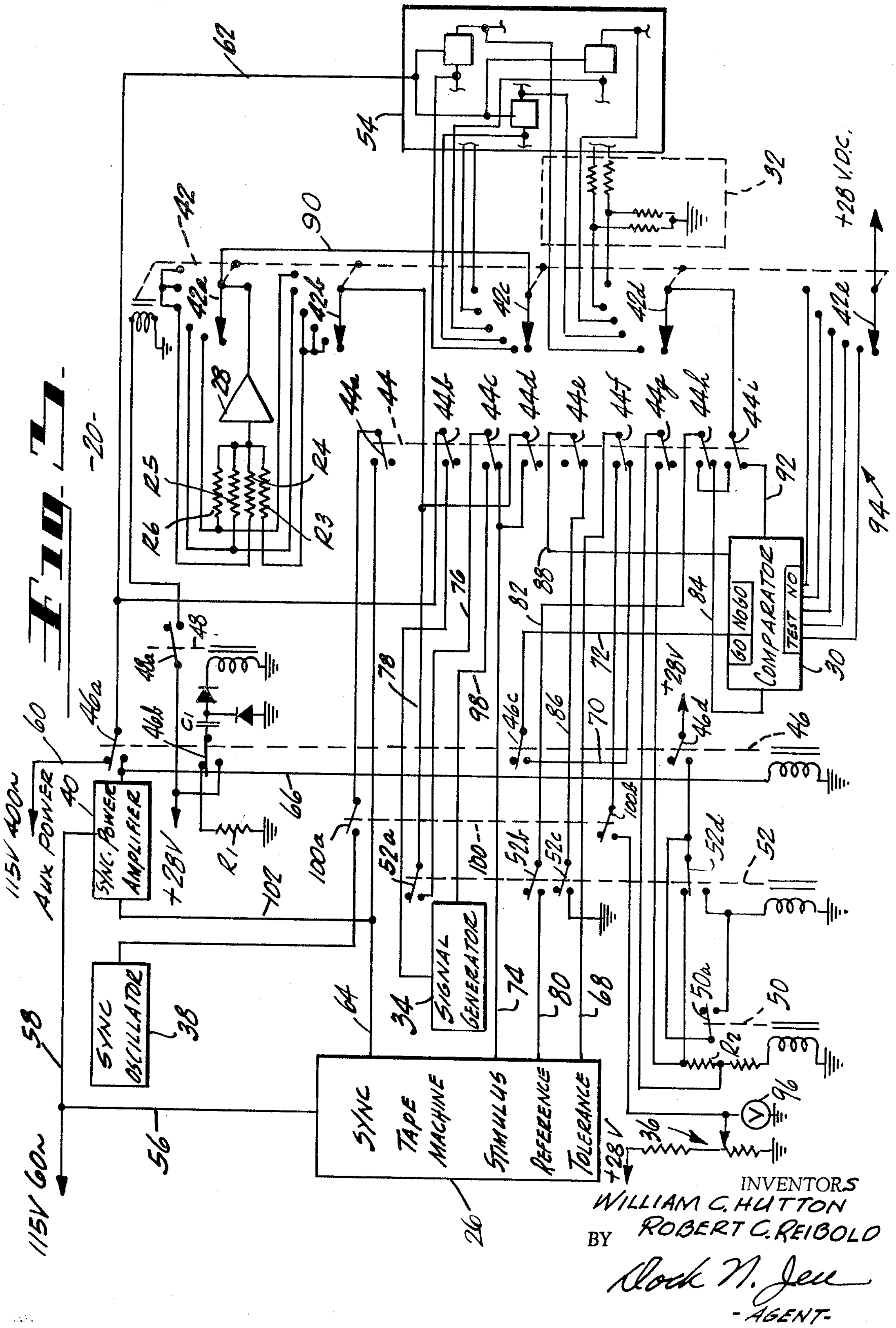

FIG. 2 is a block diagram of the analog comparison system 10 shown connected in the recording phase. The block diagram is fragmentarily shown here in a simplified form with the deletion of all other components, of the system 10, that are not necessary to a general description of the tape recording phase of the system 10. For the tape recording phase, a standard unit 20′ which is known to be operating in a condition that provides optimum, reference response signals is connected to the system 10 in the same manner in which similar test units are to be connected to the system 10.

A stimuli signal generator 22 that can be adjusted to produce different, desired, stimulus signal is suitably connected to channel CH1 and the amplifier-attenuator 14. The outputs of the adapters 18 are connected directly to channels CH3, CH5, CH7, etc. instead of the comparators 16*a*, 16*b*, 16*c*, etc. which are not involved in the recording phase. The signal generator 22 can be selectively adjusted, as desired, to provide different stimulus signals at its output. A number of different stimulus signals, for example, can be provided at the output of the generator 22 sequentially to subject the standard unit 20′ to a wide variety of stimulus signals over a given period of time. These different stimulus signals are, of course, simultaneously recorded in sequence on tape through channel CH1.

The components CO′ of the standard unit 20′ are thus stimulated by different stimulus signals in sequence to produce a wide range of reference response signals from each of the components CO′. In this manner, the response signals "*a′*," "*b′*," "*c′*," etc. from the outputs *pa′*, *pb′*, *pc′*, etc. of their respective components CO*a′*, CO*b′*, CO*c′*, etc. will also correspondingly vary. The adapters 18 adapt these optimum response signals from the components CO′ so that these signals are suitable for recordation on the tape of the machine 12. Adapted response signals "*aa′*," "*ab′*," "*ac′*," etc. from the adapters 18*a*, 18*b*, 18*c*, etc. are provided respectively on channels CH3, CH5, CH7, etc. to the recorder 12 as indicated in FIG. 2.

As the stimulus signal from the signal generator 22 is sequentially changed from one stimulus signal to another, the tolerance signals from tolerance signal sources 24 are also simultaneously changed to appropirate predetermined values. The tolerance signals from the tolerance signal sources 24*a*, 24*b*, 24*c*, etc. are applied to their respective channels CH2, CH4, CH6, etc. on the tape in the machine 12. These tolerance signals can be, for example, direct current signals which are suitably adjusted in magnitude. Of course, the corresponding tolerance signals actually recorded on tape by the frequency modulation circuitry of the machine 12 are alternating current signals.

FIG. 3 is a circuit diagram of an analog comparison system 20 which is shown in greater detail than the system 10 generally illustrated in FIGS. 1 and 2. The system 20 is essentially similar to the system 10 except that the system 20 tests the different components of a test unit in successsion whereas the system 10 tests the different components of a test unit simultaneously. The system 10 utilizes parallel branches which, of course, necessitate the use of a number of comparators 16, adapters 18 and tolerance signal sources 24. On the other hand, the system 20 only requires one comparator, adapter and tolerance signal source.

The analog comparison system 20 shown in FIG. 3 includes a tape machine 26, amplifier-attenuator 28, comparator 30, adapter means 32, signal generator 34, tolerance signal source 36, a synchronizing signal oscillator 38, synchronizing signal power amplifier 40, stepper switch means 42, record-playback switch 44, and control relays 46, 48, 50 and 52. Unit 54 which would be a test unit (54*a*) for the test phase and a standard unit (54*b*) for the record phase is connected into the system 20 as illustrated. It is to be noted that all of these components in themselves, except for the comparator 30, are essentially conventional devices which are commercially available items.

Line power at, for example, 115 volts, 60 c.p.s. is applied on leads 56 and 58 to the tape machine 26 and power amplifier 40, respectively. This line power is suitably utilized either directly, rectified or modified as required in the machine 26 and amplifier 40. The tape machine 26 can be, in this instance, a seven channel, Model FR–100 Tape Machine manufactured by Ampex Corporation of Redwood City, Calif. The power amplifier 40 is, for example, a Model D–50–H Variable Frequency Power Supply manufactured by International Research Associates of Santa Monica, Calif.

During the test phase, the unit 54 is, of course, a test unit (54*a*) connected to the system 20 as indicated in FIG. 3. Auxiliary power is provided on lead 60 to the upper contact for relay pole 46*a* to lead 62 to supply the test unit (54*a*) to keep it operating—i.e., warm and stable—between tests. The stimulus signal generator 34 and synchronizing signal oscillator 38 are used only during the record phase to produce a suitable tape for the tape machine 26. The machine 26 is started in the playback phase to provide a different signal respectively from four channels on the tape.

A synchronizing signal is produced on lead 64 and this signal is amplified by the power amplifier 40 to provide an amplified output signal which energizes the relay 46 on lead 66 and thus actuate the relay 46. The pole 46*a* is actuated to connect the output of the power amplifier 40 to lead 62 and the amplified synchronizing signal from the tape machine 26 is then applied to supply the test unit (54*a*). The synchronizing signal recorded on the tape is appropriately referenced to the stimulus signal which is also recorded on the tape for application to the test unit (54*a*). The synchronizing and stimulus signals are recorded on tape by system 20 in a manner which is described later.

The power supplied during the test phase to the test unit (54*a*) is, therefore, the same as was supplied to the standard unit (54*b*) during the record phase. If the unit 54 was a device which requires three-phase primary power, the amplified synchronizing signal output from the power amplifier 40 would then be fed to a converter to convert the single-phase synchronizing signal to three-phase power. In this instance, the first phase signal of the three-phase power would be synchronized with the single-phase synchronizing signal and hence properly referenced to the stimulus signal.

The stimulus signals are properly referenced to the single-phase power or the first phase of three-phase power supplied to unit 54 in that the carrier of the stimulus signals can be derived directly from the same synchronizing signal and thus be in phase therewith. The carrier of the stimulus signals can be further varied in phase with respect to the synchronizing signal by the signal generator 34. The synchronizing signal has a frequency of, for example, 400 c.p.s. which would also be the frequency of the carrier of the stimulus signals.

The capacitor C1 is connected to be discharged through the resistor R1 when the relay pole 46*b* is not actuated. When the pole 46*b* is actuated, however, the capacitor C1 begins to charge and the relay 48 is energized to actuate its pole 48*a* to apply +28 volts to the stepper switch means 42. The wipers 42*a*, 42*b*, 42*c*, 42*d* and 42*e* are stepped from home position to which the wipers were manually reset, to their respective first contacts. When the capacitor C1 becomes fully charged, the relay 48 is de-energized to remove the +28 volts from the stepper switch means 42.

The record-playback switch 44 is, for example, a nine-pole, two position switch which is shown in the playback position in FIG. 3. The switch poles 44*a*, 44*b*, 44*c*, 44*d*, 44*e*, 44*f*, 44*g*, 44*h* and 44*i* engage their lower contacts, respectively, in the playback position and engage their upper contacts in the record position. The tolerance signal on lead 68 is connected through the switch pole 44*f* engaging its lower contact, lead 70, actuated relay pole 46*c* and lead 72 to the comparator 30.

The actuated relay pole 46*d* applies +28 volts through the unactuated relay pole 52*d* to the time delay 50 which may be a thermal type delay relay. The relay 50 provides a delay of 11 seconds when the switch 44 is in the playback position. The switch pole 44*g* in the record position shorts out current limiting resistor R2 such that the relay 50 then has a delay of 8 seconds. The 11-second delay allows the test unit (54*a*) to stabilize or recover from the minor shock of newly applied or interrupted power as occurring between a change of successive stimulus signals. The shorter 8-second delay during the record phase is to assure that, during playback, the stimulus and reference signals will be available on tape at the end of 11 seconds.

After 11 seconds, during the test phase, the relay pole 50*a* is actuated to apply +28 volts to the relay 52 to energize the same and actuate the relay poles 52*a*, 52*b*, 52*c* and 52*d*. When the relay pole 52*d* is actuated, it removes the +28 volts from the relay 50 and applies it to the relay 52 thereby latching it so long as the relay pole 46*d* remains actuated. The stimulus signal appearing on lead 74 is connected through the switch pole 44*c* in the playback position to lead 76, actuated relay pole 52*a*, and lead 78 to the wiper 42*b* of the stepper switch means 42.

The reference signal on lead 80 is applied through the actuated relay pole 52*b* to lead 82, switch pole 44*h* in its playback position, and lead 84 to the comparator 30. Also, a ground is connected through the actuated relay pole 52*c* to lead 86 and the lower contact for the switch pole 44*e*. When the switch pole 44*e* is in the playback or test position, the ground is connected to lead 88 from the comparator 30. The purpose of this ground connection is to provide a ground return for the go, no go indicator in the comparator 30 only when a stimulus signal was to be applied to the test unit (54*a*).

As mentioned above, the stimulus signal on lead 74 is connected in the playback phase through switch pole 44*c* and relay pole 52*a* to the switch means wiper 42*b* when the relay pole 52*a* is actuated. Also, all of the wipers of the stepper switch means 42 have been stepped to engage their first contact from home position. The amplifier-attenuator 28 includes four resistors R3, R4, R5 and R6 connected at its input. As the wipers 42*a* and 42*b* are stepped through their respective contacts, the resistors R3, R4, R5 and R6 are selectively connected as input and feedback resistors for the operational amplifier of the amplifier-attenuator 28 to vary the gain thereof.

The resistors R3, R4, R5 and R6 are of certain resistances such that the gain of the amplifier-attenuator 28 is varied from contact to contact to provide gains of .01, .1, 1, 10 and 100 respectively for the five contacts of the stepper switch means 42 from the home position of the engaging wipers. It is to be understood, of course, that only five connections of, for example, four input and feedback resistors have been illustratively shown in FIG. 3, and that many more differing connections are often obtained by the use of stepper switch means having a greater number of contacts used in conjunction with suitable input and feedback resistors.

The output of the amplifier-attenuator 28 is connected by lead 90 to the switch means wiper 42*c* which engages its different contacts to apply the stimulus signal output from the amplifier-attenuator 28 to different points or components in the test unit (54*a*). The test response signals from various output points or components in the test unit are adapted by respective channels or branches of the adapter means 32 and are selectively connected by the wiper 42*d*, switch pole 44*i* engaging its lower contact and lead 92 to the comparator 30, for comparison with the reference signal provided on the lead 84.

The adapter means 32 have been shown in FIG. 3 to include a plurality of divider networks which reduce the magnitude of the output response signals at the wiper 42*d*. Thus, the adapter means 32 is an attenuator. The purpose of the adapter means 32 is to reduce, when necessary, the output response signals from the standard unit (54*b*) during the record phase so that signals of reasonable magnitudes will be applied to the tape machine 26 by way of wiper 42*d*, switch pole 44*i* engaging its upper contact, switch pole 44*h* engaging its upper contact, lead 82, actuated relay pole 52*b* and lead 80.

During the playback phase, the adapter means 32 serves as required to reduce the output response signals from the test unit (54*a*) for application to the comparator 30 so that these signals will be comparable to the comparison reference response signals from the standard unit (54*b*) previously recorded by the tape machine 26 and supplied to the comparator 30. It will be apparent that if some of the output response signals were selected from certain points or components in the standard unit which yield reference response signals smaller or below the level acceptable for recording by the tape machine 26, the adapter means 32 must include an amplifier. Accordingly, in such instance, the adapter means 32 must be an amplifier-attenuator similar to the amplifier-attenuator 28.

The adapter means 32 can be omitted if the tape machine 26 had a sufficiently wide range of operation so that it is then unnecessary to modify or adapt the signals provided thereto for recording. The term "adapter means" as used herein is to be construed literally and broadly; that is, any means for adapting a signal. Thus, the adapter means 32 indicated by the block surrounding the illustrative divider networks is understood to include an amplifier-attenuator, for example.

The wiper 42*e* of the stepper switch means 42 engages successive contacts which are individually connected to the comparator 30 as shown in FIG. 3. Leads 94 are connected to respective indicating lamps in the comparator 30 and a different test number is illuminated corresponding to each of the successive contacts from home position of the wiper 42*e*. It is noted that the comparator 30 can be entirely disconnected from the system 20 during the recording phase.

In the recording phase, the switch 44 is actuated so that its switch poles engage their respective upper contacts. The unit 54 then used is, of course, the standard unit (54*b*) which is connected into the system 20 as shown in FIG. 3. The stepper switch means 42 is manually reset to home position and the tolerance signal source 36 is properly adjusted to provide a tolerance signal of the characteristic desired for the first test. The tolerance signal, for example, can be a direct voltage wherein 1 volt corresponds to a tolerance margin of 100%. Accordingly, the source 36 is adjusted to provide a desired tolerance signal by setting a characteristic voltage indicated on meter 96 wherein the indicated voltage is proportional to 1 volt as the desired tolerance margin is proportional to 100%.

The signal generator 34 is also adjusted to provide the proper signal for the first test. A stimulus signal of desired magnitude, frequency and phase is provided on lead 98. The frequency of the signal from the signal generator 34 is normally adjusted to be the same as, or the signal frequency can be derived from, the synchronizing signal of the oscillator 38. Further, the phase of the signal from the generator 34 is preferably adjusted to be either in phase or 180 degrees out of phase with that of the synchronizing signal. The signal generator 34 can be, for example, a servoscope. The reason for having frequency and phase of the generator signal so related to those of the synchronizing signal is because of the nature of the equipment included in the unit 54.

Synchronous demodulators and the like, for example, may be included in the unit 54. The demodulators are, of course, operated at the frequency of the amplified synchronizing signal from power amplifier 40. By having the frequency and phase of the output signal of the oscillator 34 be related to those of the synchronizing signal in the manner described above, any faulty equipment in the test unit (54*a*) will be more readily discernible under such optimum conditions because differences in response normally become more pronounced at the maximum and minimum points under the noted frequency and phase conditions. Of course, if the unit 54 does not employ synchronous demodulators or similar equipment which is frequency and phase sensitive, the stimulus signal provided by the signal generator 34 may well be selected to have other desirable characteristics for producing the most useful response signals from the components in the unit 54.

The tape is then placed in motion in the machine 26. When the tape is up to proper speed after approximately one second, switch 100 is closed with the actuation of the switch poles 100*a* and 100*b* to their respective contacts. Since the mode switch 44 has been placed in its record position, the output signal of the synchronizing signal oscillator 38 is connected through poles 100*a* and 44*a* to lead 64 to the first tape channel of machine 26, and through lead 102 to the input of the power amplifier 40. At the same time, the tolerance signal is connected through poles 100*b* and 44*f* to lead 68 to the fourth tape channel of the machine 26. The amplified output from the power amplifier 40 energizes the relay 46 by way of lead 66 and causes the relay poles 46*a*, 46*b*, 46*c* and 46*d* to be actuated to their respective lower contacts.

The sequence of operation of the relay 48, stepping switch means 42, relay 50 and relay 52 is substantially the same as described previously for the playback phase. Since the mode switch 44 has been placed in the record position, however, the resistor R2 is bypassed with the switch pole 44*g* in the record position such that a greater current is permitted to flow to the delay relay 50 which is then actuated after, for example, 8 seconds instead of 11 seconds as in the playback phase. By waiting 8 seconds instead of the normal 11 seconds, the stimulus and reference signals are recorded on the second and third tape channels early enough to assure their availability on tape during the playback phase at the end of 11 seconds following energization of the relay 46.

After approximately 30 seconds from the time that the tape was placed in motion in the record mode, switch 100 is opened and almost immediately the relay 46 is deenergized with the disruption of the synchronizing signal from oscillator 38 and the consequent cessation of output signal from the power amplifier 40. The tape machine 26 is then stopped and preparations made for the second test wherein the magnitude or phase of the stimulus signal from the signal generator 34 can be changed to a different value or condition. The recording procedure is repeated as described above for each successive test which covers approximately 30 seconds. These tests can be much shorter in duration, the minimum time being a function of the time constants in the unit 54.

The above description is graphically illustrated by the chart shown in FIG. 8. Three tests are indicated over a length of tape and the bars located horizontally along the first four tape channels diagrammatically depict the relative start, duration and end of the synchronizing reference, stimulus, reference response and tolerance signals recorded on the tape. The chart is believed to be generally self-explanatory and further description thereof need not be made.

Illustrative test requirements are as follows. For the first test, the stimulus signal at the input of the test unit (54*a*) is .01 volt RMS, 400 c.p.s. and in phase with the supply signal thereto, and the response signal at the output of the test unit is to be .004 volt RMS, 400 c.p.s. and in phase. The tolerance for a satisfactory comparison is 24.3% so that an acceptable output would be .004+.001 volt. It will be observed that since the tape machine 26 has a maximum capability of 1.0 volt, this can be the input voltage to the amplifier-attenuator 28 which is connected to have a gain of .01. For the second test, the input to the test unit can be .1 volt RMS, 400 c.p.s. and 180 degrees out of phase with respect to the supply signal, and the response signal is to be .03 volt RMS, 400 c.p.s. and also 180 degrees out of phase with respect to the supply signal. The tolerance is again 24.3%. In the third test, all requirements are similar to the first test except that the magnitudes of the input and output signals are 1 volt RMS and .27 volt RMS, respectively.

When the input signal to the test unit (54*a*) is to be 10 volts RMS, 400 c.p.s. and in phase with the supply signal, the output of the test unit is to be 2.4 volts RMS, 400 c.p.s. and in phase. Under these conditions, it is apparent that the amplifier-attenuator 28 requires a gain of 10 for a 1 volt input thereto and the adapter means 32 must reduce the 2.4 volts to a value under 1 volt which the tape machine 26 can handle. For a tolerance of +24.3%, the tolerance signal recorded on the fourth tape channel through lead 68 must also be suitably adjusted in the same proportion as the output response signal from the test unit was attenuated.

Figure 4:
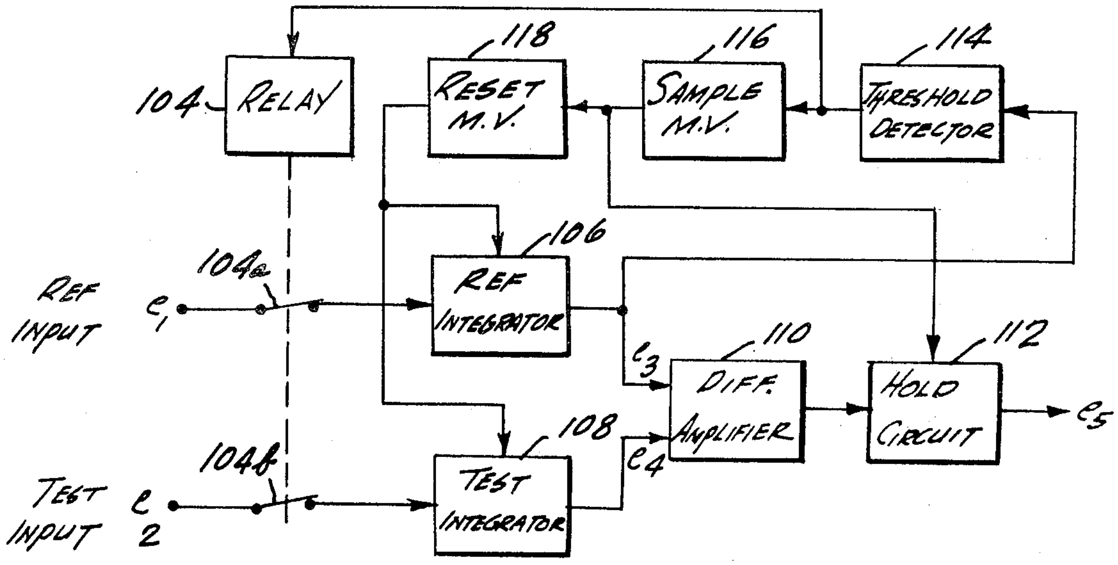
FIG. 4 is a block diagram showing a simplified, basic circuit portion of an analog comparator in accordance with this invention.

FIG. 4 is a block diagram showing a simplified, basic circuit portion of the comparator 30. The comparator 30 rapidly and continuously compares a dynamic or static test signal with a dynamic or static reference signal and determines the error existing between the two signals. The compared signals can be two steady-state or complex analog signals and the error is determined as a percentage error; that is, the ratio of the difference between the test signal and reference signal to the reference signal. This comparison is made in terms of signal amplitudes as a primary criteria in the determination of the quality or acceptability of the test signal and secondarily in terms of signal time displacement between the compared signals.

The basic circuit portion of the comparator 30 as shown in FIG. 4 avoids the use of nonlinear elements which are characteristically temperature sensitive. Instead, resistance-capacitance integrators are utilized in a circuit whereby the desired ratio is obtained as a direct function of the relative value of the integrals of the test and reference signals at a specifiic time. Thus, in FIG. 4, the reference input signal $e_1$ and the test input signal $e_2$ are applied through the normally closed relay poles 104*a* and 104*b* of relay 104 engaging their respective contacts, to reference and test integrators 106 and 108. The output signals $e_3$ and $e_4$ of the integrators 106 and 108 are applied to respective inputs of differential amplifier 110 which has its output applied to the input of a hold circuit 112. The hold circuit 112 has an outpt signal $e_5$.

The integrators 106 and 108 charge until the output signal $e_3$ of the reference integrator 106 reaches the preset threshold level of threshold detector 114. At this time, the detector 114 produces an output signal which energizes the relay 104 to actuate its poles 104*a* and 104*b* and triggers sample multivibrator 116. The relay poles 104*a* and 104*b* are opened from their respective contacts breaking the circuits to the reference and test input signals $e_1$ and $e_2$. At the same time, the sample multivibrator 116 produces an output signal of a predetermined duration which triggers reset multivibrator 118 after a predetermined delay, and also commands the hold circuit 112 to sample and hold the output signal from the differential amplifier 110. After the hold circuit 112 has accomplished this, the reset multivibrator 118 is triggered to produce an output which resets the reference and test integrators 106 and 108 to prepare the circuit for further operation upon the closing of the relay poles 104*a* and 104*b* back to their respective contacts when the signal $e_3$ drops below a level which de-energizes the threshold detector 114 and removes its output signal from the relay 104.

The output signal $e_5$ of the hold circuit 112 represents the percentage error existing between $e_2$ and $e_1$ as shown below.

$$e_3=\int_0^t e_1 dt \qquad \text{Equation 1}$$

$$e_4=\int_0^t e_2 dt \qquad \text{Equation 2}$$

Let $e_3=K=1$, determined by threshold detector 112. Then, from Equation 1, $$e_3=e_1 t=1$$

or $$t=1/e_1 \qquad \text{Equation 3}$$

From Equation 2, $$e_4=e_2 t \qquad \text{Equation 4}$$

Substituting the value of $t$ from Equation 3 into Equation 4, $$e_4=e_2/e_1 \qquad \text{Equation 5}$$

Since, $$e_5=e_4-e_3 \qquad \text{Equation 6}$$

$$e_5=(e_2/e_1)-1$$

or $$e_5=(e_2-e_1)/e_1 \qquad \text{Equation 7}$$

The foregoing showing is valid when $e_1$ and $e_2$ are constant for the period of integration. However, the proof is equally valid when $e_1$ and $e_2$ are sinusoidally varying voltages. The percentage error is in terms of peak amplitude whether the integration time comprises a small part of one cycle or several cycles. It is, of course, necessary to precede the integrators with absolute value detectors which adapt a bilateral signal such as a sine wave signal before it can be applied to an integrator.

The following proof demonstrates that the percentage error as determined by the basic circuit portion of the comparator 30 is valid for sinusoidal signals regardless of the number of cycles or degrees of a cycle required for its determination.

Let $e_1$=peak value of reference input signal.
$e_2$=peak value of test input signal.
$e_3$=output signal of reference integrator 106.
$e_4$=output signal of test integrator 108.
$e_5$=percentage error analog signal.

From the above, $$e_3=\int_{t_1}^{t_2} e_1 \sin wt\, dt \qquad \text{Equation 8}$$

$$e_4=\int_{t_1}^{t_2} e_2 \sin wt\, dt \qquad \text{Equation 9}$$

Let $e_3=k=1$, a function performed by the threshold detector 114.

Then, from Equation 8, $$e_3=e_1\ (\cos wt_1=-\cos wt_2)=1$$

or $$\cos wt_1-\cos wt_2=1/e_1 \qquad \text{Equation 10}$$

Since, from Equation 9, $$e_4=e_2\ (\cos wt_1-\cos wt_2)$$

$$e_4=e_2/e_1 \qquad \text{Equation 11}$$

Now, $$e_5=e_4-e_3$$

or $$e_5=(e_2/e_1)-1=(e_2-e_1)/e_1 \qquad \text{Equation 12}$$

Figure 5:
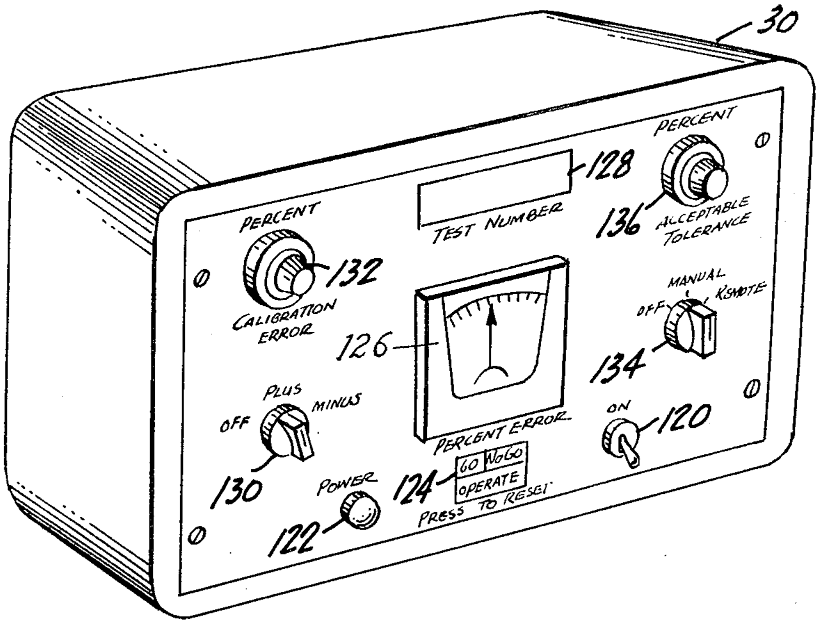
FIG. 5 is a perspective view showing one arrangement of the front panel of the analog comparator.

FIG. 5 is a frontal perspective view illustrating a satisfactory configuration of the front panel of the comparator 30. A power control switch 120 and a power indicator lamp 122 are mounted on the right and left sides, respectively, of a go, no go indicator unit 124. A percentage error meter 126 is located above the unit 124, and above the meter 126 is located a test number indicator strip 128. A calibration switch 130 is located to the left of the meter 126, and above the switch 130 is located a percent calibration error adjustment knob 132. A tolerance signal selector switch 134 is positioned at the right of the meter 126, and above the switch 134 is located a percent acceptable tolerance adjustment knob 136. The operation and function of these control and indicating elements of the comparator 30 will be more fully explained in the following detailed description of the comparator circuitry.

FIGS. 6A, 6B, 6C and 6D, together, comprise a circuit diagram of an exemplary embodiment of the comparator 30. Leads, *f*, *g* and *h* are interconnected between FIGS. 6B, 6C and 6D. These three leads are correspondingly labeled at their broken ends in the FIGS. 6B, 6C and 6D so that similarly labeled lead ends can be easily matched together. Other lead terminals shown in FIGS. 6A, 6B, 6C and 6D are to be connected in the manner indicated. It is apparent that certain of these lead terminals can be connected in system 20 as shown in FIG. 3.

Figure 6A:
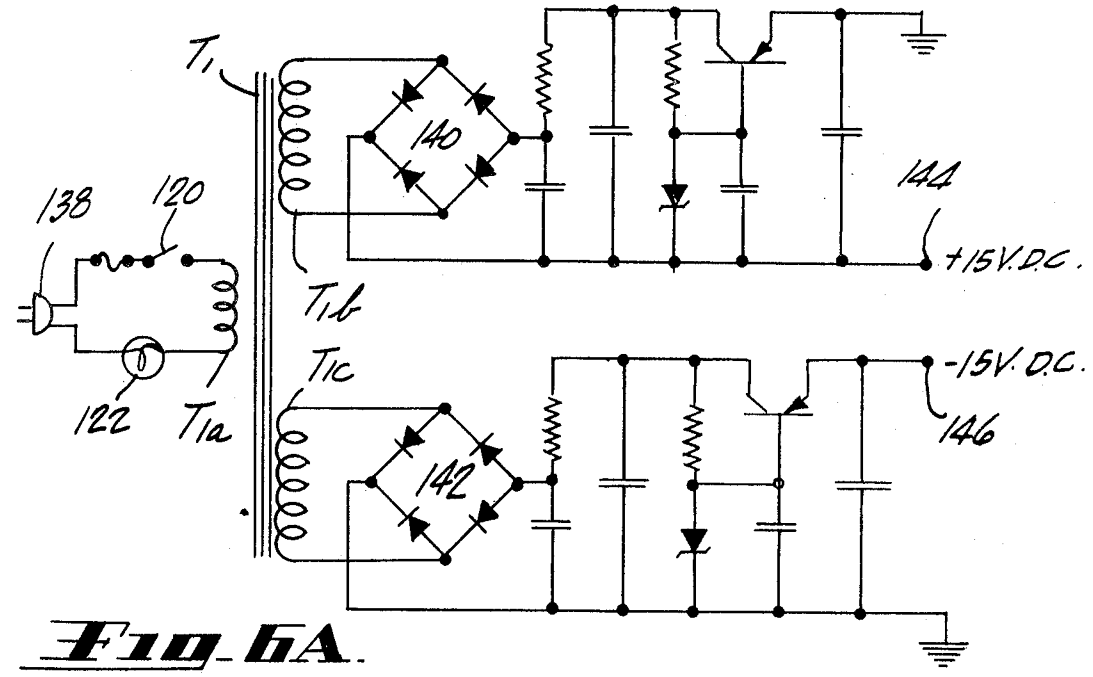

FIG. 6A is a circuit diagram of the direct current supply for the comparator 30. Ordinary line power of 115 volts, 60 c.p.s. is provided at plug 138. When power switch 120 is closed, the indicator lamp 122 is lit and the primary winding T1*a* of the transformer T1 is energized. Full wave rectifiers 140 and 142 connected to the secondary windings T1*b* and T1*c*, respectively, rectify the transformed alternating current into direct current which is filtered and regulated in a conventional manner to provide +15 volts at terminal 144 and −15 volts at terminal 146. These voltages are suitably utilized by equipment in the comparator 30.

Figure 6B:
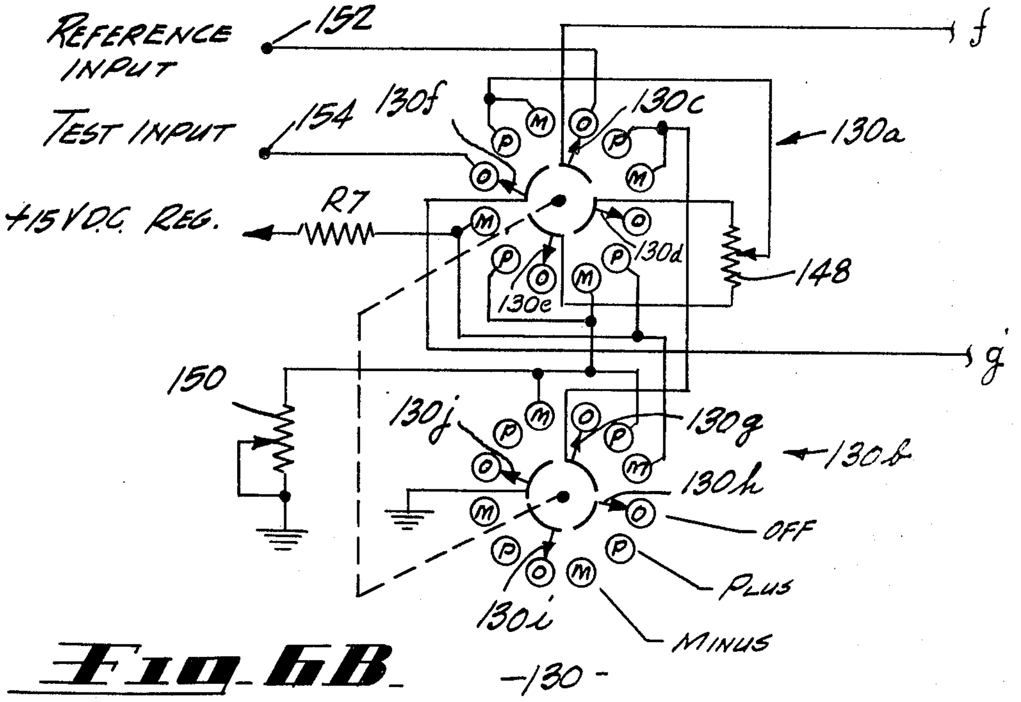

FIG. 6B is a circuit diagram showing the connections of calibration switch 130, calibration error potentiometer 148 an a reference signal adjustment rheostat 150. The switch 130 is a double wafer, four wiper each, three position, ganged rotary switch .The switch 130 is shown in its "off" position in FIG. 6B. The upper wafer 130*a* has its four wipers 130*c*, 130*d*, 130*e* and 130*f* engaging the "0" contacts of the upper wafer as indicated. Similarly, the lower wafer 130*b* also has its four wipers 130*g*, 130*h*, 130*i* and 130*j* engaging the "0" contacts of the lower wafer.

The "0" contact of the wiper 130*c* is connected to reference input terminal 152. This terminal 152 is normally connected to the lead 84 in FIG. 3. Similarly, the "0" contact of the wiper 130*f* is connected to the test input terminal 154 which is normally connected to the lead 92. It can be seen that the terminals 152 and 154 are connected respectively to the leads *f* and *g* when the calibration switch 130 is in the "off" position, and none of the other switch wipers are connected to any active contacts at such time.

When the switch 130 is placed in the "plus" position, all its wipers engage their respective "P" contacts. The regulated +15 volts DC is then connected in series through the resistor R7, wiper 130*d*, the resistance of the potentiometer 148, wiper 130*e* and the resistance of the rheostat 150 to ground. The reference input lead *f* is connected to the common junction between the lower end of the potentiometer 148 and the upper end of the rheostat 150 through the wipers 130*c*, 130*g* and 130*e* engaging their respective "P" contacts. The test input lead *g* is connected to the wiper of the potentiometer 148 through the wiper 130*f* engaging its "P" contact.

The rheostat 150 is adjusted to hold the reference input lead *f* at a constant voltage $e_{ref.}$ (approximately 10 millivolts, for example) and the voltage $e_{test}$ on the test input lead *g* can vary from that value $e_{ref.}$ to twice such value by a clockwise rotation of the knob 132 (FIG. 5) of the potentiometer 148, or from bottom to top movement of the wiper of the potentiometer 148 as shown in FIG. 6B. This is, of course, obtained by suitable selection of the resistance values of the resistor R7, potentiometer 148 and rheostat 150. Relatively little adjustment changes of the resistance of the rheostat 150 is needed once it is set.

For the "plus" position of the calibration switch 130, at the full clockwise position of the knob 132 of the potentiometer 148, $e_{test}$ equals $2e_{ref.}$ which represents +100% error. Since percent $$\text{error}=(e_{test}-e_{ref.})(100/e_{ref.})$$

and the value of $e_{test}$ is always larger than, or at least equal to, $e_{ref.}$, the error has a positive value. For the "minus" position of the switch 130, all of its wipers engage their respective "M" contacts in FIG. 6B. In this condition, the regulated +15 volts DC is connected through resistor $R_1$, wiper 130*e*, the resistance of potentiometer 148, wiper 130*d*, and to ground through the wiper 130*j*. Thus, the resistor R7 and potentiometer 148 are connected in series, and the rheostat 150 is shorted out by the ground connection through the wiper 130*j*.

The reference input lead *f* is connected to the common junction between the resistor R7 and the lower end of the potentiometer 148 through the wipers 130*c* and 130*g* engaging their respective "M" contacts. The test input lead *g* is connected to the wiper of the potentiometer 148 through the wiper 130*f* engaging its "M" contact. The voltage $e_{ref.}$ on the reference input lead *f* is, therefore, held constant and the voltage $e_{test}$ on the test input lead *g* can vary from this same voltage $e_{ref.}$ to zero volts for clockwise rotation of the knob 132 of the potentiometer 148 from its counterclockwise position (lower end of the potentiometer 148 in FIG. 6B) to its clockwise position (upper end of the potentiometer 148 in FIG. 6B). Since $e_{ref.}$ is always larger than $e_{test}$, the percent error is negative in accordance with their relationship as previously described above.

Figure 6C:
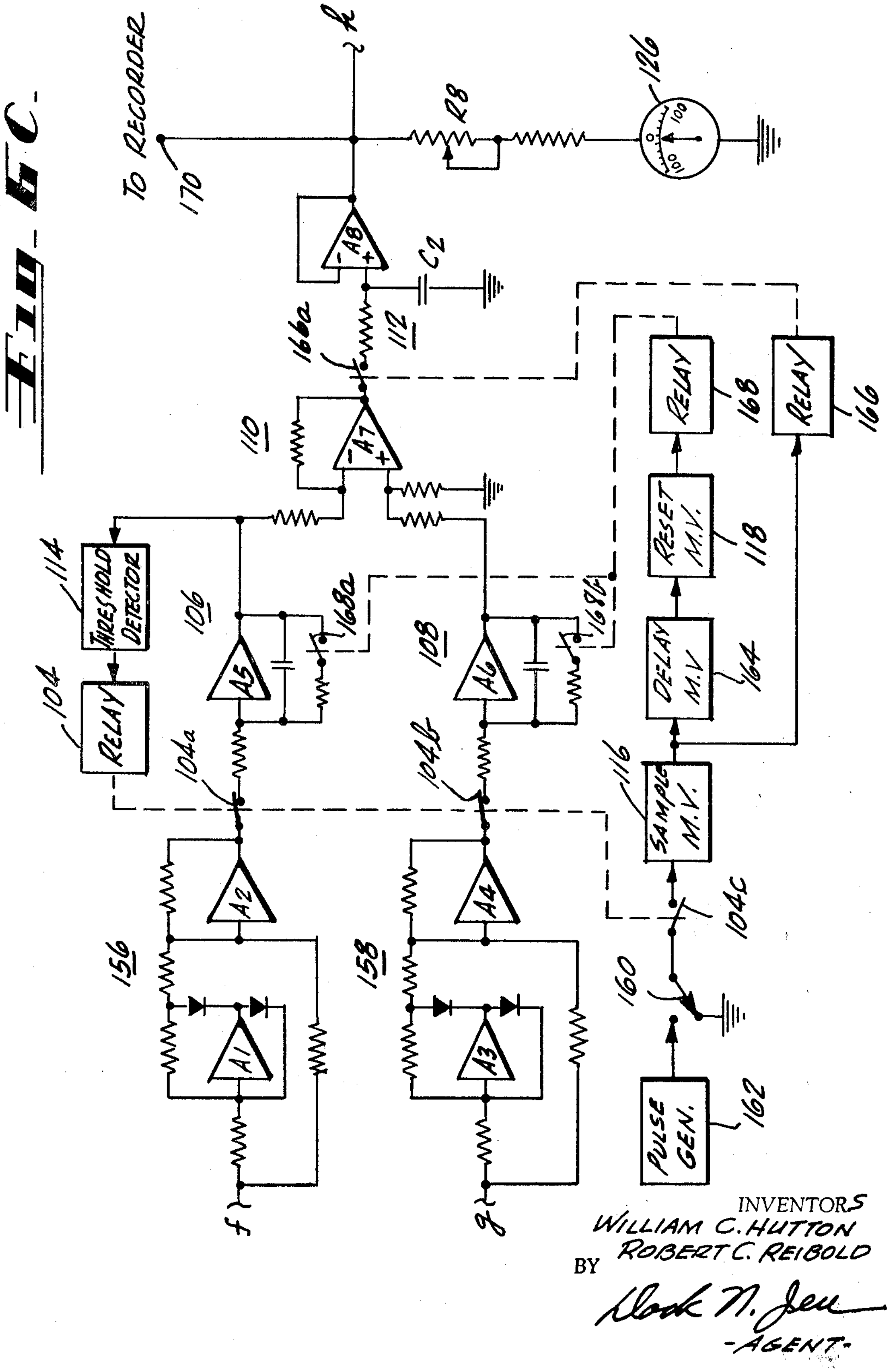

FIG. 6C shows a continuation from the leads *f* and *g* in FIG. 6B of the circuit diagram for the comparator 30. The operational amplifiers A1 and A2 are connected in an abosolute value detector 156 for the reference input signal appearing on lead *f*. Similarly, the operational amplifiers A3 and A4 are connected in an absolute value detector 158 for the test input signal appearing on lead *g*. The first operational amplifier of a detector is responsive to positive input signals only and its output signal is further amplified by the second operational amplifier providing a positive output signal for the positive input signal to the first operational amplifier. A gain of 2 is obtained through the two operational amplifiers.

The same positive input signal is also applied directly to the second operational amplifier which produces a negative output signal therefrom with a gain of 1. The net gain for positive input signals is, therefore, +1. Negative input signals are not passed through the first operational amplifier but are amplified with a gain of −1 in the second operational amplifier. Thus, only positive output signals are obtained from the detectors 156 and 158. It is noted that the lower feedback diode connected to the first operational amplifier is provided to prevent saturation of the first operational amplifier.

The output signals from the detectors 156 and 158 are applied to integrators 106 and 108, respectively, through the normally closed relay poles 104*a* and 104*b*. The outputs of the integrators 106 and 108 are applied to respective inputs of the differential amplifier 110. The output of the integrator 106 is also applied to threshold detector 114 which is energized when the output signal of the integrator 106 reaches or exceeds a predetermined level. The relay 104 will be then energized and its poles 104*a* and 104*b* actuated to open their respective circuits.

At the same time, relay pole 104*c* is closed to connect a ground to the sample multivibrator 116. This triggers the multivibrator 116. The ground is connected through the pole of a two position switch 160 engaging its lower contact. A pulse generator 162 can also be connected to the sample multivibrator 116 when the pole of the switch 160 is placed at its upper contact. The pulse generator 162 can be adjusted to provide suitable output pulses at various selected pulse rates to trigger the sample multivibrator 116 at such rates. By varying the rate output of the generator 162, sampling can be accomplished according to a predetermined function or other logic.

The sample multivibrator 116 is triggered to provide an output signal of a predetermined duration which is applied to delay multivibrator 164 and relay 166. The delay multivibrator 164 is, in turn, triggered and the relay 166 energized by the output of the sample multivibrator 116. The relay pole 166*a* is closed to connect the output of the differential amplifier 110 to a hold circuit 112 including a storage capacitor C2. The delay multivibrator 164 is provided to allow the output sample relay 166 pole to open before the integrators 106 and 108 are reset when the reset multivibrator 118 energizes the relay 168 which closes the relay poles 168*a* and 168*b* discharging the integrators 106 and 108 from their particular integrated values.

Amplifier A8 is connected to provide a high impedance input and is used for impedance isolation between the holding capacitor C2 and loads consisting of the percentage error meter 126, an analog recorder which may be connected to terminal 170 and tolerance limit detector means connected to lead *h*. The meter 126 is connected in series with an adjustable resistor R8. The resistor R8 is adjusted so that the needle of the meter 126 will be deflected the proper amount according to the setting of the knob 132 of the potentiometer 148 shown in FIGS. 5 and 6B.

Figure 6D:
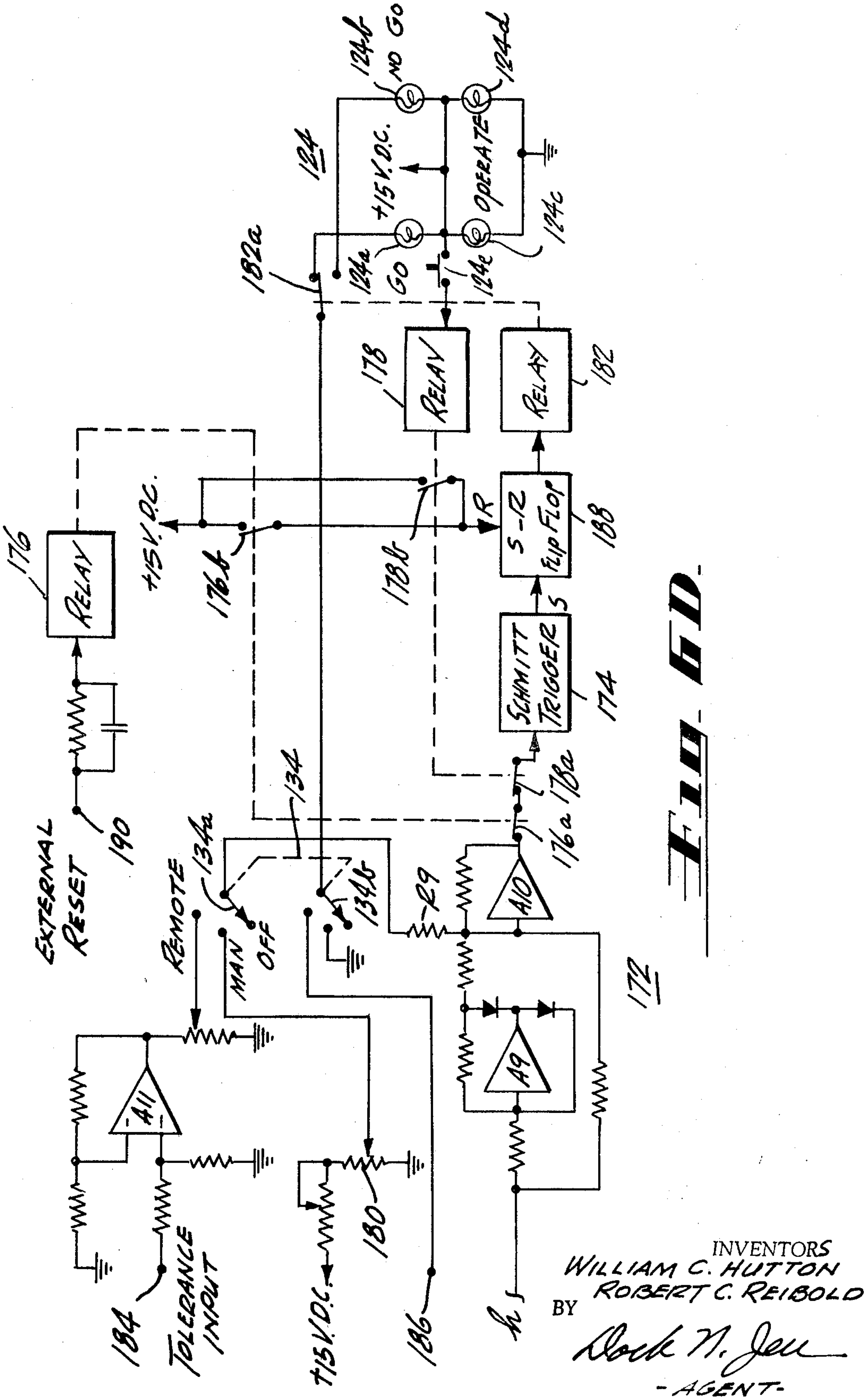

FIG. 6D shows the balance of the circuit diagram of the comparator 30. The positive or negative percentage error signal on lead *h* is applied to an absolute value detector 172 which is connected as a tolerance limit detector 172 by the connection of a tolerance input signal applied through resistor R9. The detector 172 converts the bilateral signal on lead *h* to a unilateral signal at the detector's output. A positive tolerance signal is applied through the resistor R9 to the operational amplifier A10 and appears at the output thereof as a negative signal. If the unilateral signal converted from the percentage error signal on lead *h* exceeds the tolerance signal at the output of the detector 172 by the necessary amount to reach the predetermined trigger level of the Schmitt trigger 174, the trigger 174 is fired through the normally closed relay poles 176*a* and 178*a* of reset relays 176 and 178.

The tolerance signal selector switch 134 is a double pole, three position switch. When the poles 134*a* and 134*b* are positioned to engage their respective second contacts, the switch 134 is in the "Manual" position and the wiper of potentiometer 180 is connected to the resistor R9 through the pole 134*a*. The wiper of the potentiometer 180 is adjusted by knob 136 (FIG. 5) which can be set to the desired percent acceptable tolerance as marked thereon and indicating against an index point. An appropriate tolerance signal is then applied to the detector 172 through the resistor R9.

A ground connection is provided through the pole 134*b* engaging its second contact. This ground connection completes the circuit from +15 volts DC through the "go" indicator lamp 124*a* when the relay pole 182*a* of relay 182 is engaging its upper contact as shown in FIG. 6D. When the relay 182 is energized, however, the relay pole 182*a* engages its lower contact and the ground is connected to the "no go" indicator lamp 124*b* causing it to be lit. It is to be noted that the "operate" indicator lamps 124*c* and 124*d* are always lit so long as power is turned on.

When the switch 134 is placed in its "Remote" position, the pole 134*a* engages its third contact and is thus connected to the output of operational amplifier A11. The input terminal 184 is normally connected to the lead 72 as shown in FIG. 3 such that the tape recorded tolerance signal would be applied thereto in the playback phase when the relay 46 is energized. The switch pole 134*b* in FIG. 6D engages its third contact and is connected to the terminal 186. This terminal 186 is normally connected to the lead 88 (FIG. 3) which, during the playback phase, is connected to ground when the relay 52 is energized. This occurs when a stimulus signal is being applied to the unit 54.

The Schmitt trigger 174 is fired when the percentage error signal on lead *h* exceeds the tolerance established by the tolerance signal applied to the detector 172 through the resistor R9 shown in FIG. 6D. Flip-flop 188 is set by the output of the Schmitt trigger 174 and the relay 182 is energized. This causes the relay pole 182*a* to engage its lower contact and connect the "no go" indicator lamp 124*b* to ground when the switch 134 is in either the "Manual" or Remote" positions. The "no go" lamp 124*b* remains lit so long as there is a ground connection and the relay 182 is energized. Anytime that a "no go" indication is obtained during a test, the component then tested in the test unit (54*a*) is defective or unsatisfactory.

Reset is accomplished by pressing the switch 124*e* or applying a suitable reset signal to external reset terminal 190. When switch 124*e* is closed, the relay 178 is energized which opens the relay pole 178*a* and closes the relay pole 178*b*. This interrupts the input signal to the Schmitt trigger 174 and applies +15 volts to reset the flip-flop 188 and de-energized the relay 182. Applying a reset signal at terminal 190 energizes the relay 176 and accomplishes reset in a similar manner by opening the relay pole 176*a* and closing relay pole 176*b*. The relay pole 176*a* is in series with the relay pole 178*a* and the relay pole 176*b* is in parallel with the relay pole 178*b*.

FIGS. 7A and 7B, together, show a circuit diagram of a comparator employing input transformer coupling and nonlinear integrators. This version of the comparator is simpler than the one shown in FIGS. 6A through 6D and is more economical to manufacture. The reference and test input signals are applied to respective input terminals 192 and 194 which are shown in FIG. 7A. The reference and test signals are passed through their respective coupling capacitors C3 and C4, and normally closed input relay poles 196*a* and 196*b* to the grids of tubes V1*a* and V1*b*. The two sections of tube V1 each provides a high input impedance to the input signals as well as voltage amplification thereof.

The amplified reference and test signals are transformer coupled by their respective transformers T2 and T3 from the anodes of the amplifiers V1*a* and V1*b* and are rectified by diodes D1 and D2 connected in series with the secondaries of the transformers. The secondaries are loaded with approximately equal resistances. The load resistance for the secondary of the transformer T3 has a variable resistor R10. This affords a trim adjustment for equalizing the gains of the amplifiers V1*a* and V1*b*.

The rectified reference and test signals are then integrated by their respective resistance-capacitance networks R11–C5 and R12–C6. The integration capacitors C5 and C6 are isolated from their respective output loads by cathode followers V2*a* and V2*b*. The outputs of the cathode followers V2*a* and V2*b* are fed through their respective relay poles 198*a* and 198*b* of the output sample relay 198 (FIG. 7B) during the sampling interval when relay 198 is energized to their holding capacitors C7 and C8 and to the grids of tube sections V3*a* and V3*b*. The tube V3 is connected as a differential amplifier having the percentage error meter 200 which is connected between the cathodes of the tube.

The output of the cathode follower V2*a* is also fed to a threshold detector 202 including the transistors Q1 and Q2 connected in a Schmitt trigger. When the output from the cathode follower V2*a* exceeds the breakdown voltage of the Zener diode D3 and the threshold level is reached, the threshold detector 202 is triggered causing the relay 196 to become de-energized to open the closed relay poles 196*a* and 196*b*. It is noted that when the relay 196 is not energized, the relay 204 is energized.

Following the broken line *k* from the relay 204 to FIG. 7B, it can be seen that the relay pole 204*a* is closed when relay 204 (FIG. 7A) is energized. The transistors Q3 and Q4 are connected as a pulse generator 206 providing pulses at a rate of, for example, 100 per second. The pulse signal is passed through the closed relay pole 204*a* of the threshold detector relay 204 to the output sample multivibrator 208 comprising the transistors Q5 and Q6, triggering this multivibrator 208. After a predetermined duration (approximately 5 milliseconds), the multivibrator 208 returns to its quiescent state. During the triggered state, the relay 198 is energized closing the relay poles 198*a* and 198*b* along broken line *l*. When the multivibrator 208 returns to its quiescent state, this change in state is used to trigger the delay multivibrator 210 including the transistors Q7 and Q8.

The purpose of the delay (approximately 1 millisecond) is to assure that the relay poles 198*a* and 198*b* of the output sample relay 198 have opened before the reset multivibrator 212 including the transistors Q9 and Q10 is triggered by the output of multivibrator 210. When the reset multivibrator 212 is triggered, the relay 214 is energized to actuate its poles 214*a* and 214*b* and short out the integrating capacitors C5 and C6 following the broken line *m* from FIG. 7B to FIG. 7A. After the integrating capacitors C5 and C6 have discharged, the threshold detector 202 returns to its quiescent state and the cycle is repeated.

It is noted that hte switch 216 in FIG. 7A can be pressed so that its pole engage the lower terminal for a ground connection and the meter 200 can be set for −100% error since the test input signal is then reduced to zero. When the switch 218 in FIG. 7B is closed, the sample and reset multivibrators 208 and 212 are triggered, energizing the sample relay 198 and reset relay 214. This closes the relay poles 198*a*, 198*b*, 214*a* and 214*b* (FIG. 7A) such that the meter 200 can then be set to zero by potentiometer 220.

It is to be understood that the particular embodiments of this invention as described above and shown in the drawings are merely illustartive of, and not restrictive on, the broad invention and that various changes in design, structure and arrangement may be made without departing from the true spirit of the invention.

We claim:

1. An analog comparator comprising:
a first integrator means having a first signal applied thereto and producing a first integrated output signal therefrom;
a second integrator means having a second signal applied thereto and producing a second integrated output signal therefrom;
differential amplifier means having said first and second output signals applied thereto for producing a differential output signal therefrom;
a threshold detector means responsive to a predetermined level of said first output signal and producing a sample signal therefrom; and
means responsive to said sample signal for sampling said differential output signal.

2. The invention as defined in claim 1 including means for converting a first bilateral signal to a first unilateral signal for application to said first integrator means, and means for converting a second bilateral signal to a second unilateral signal for application to said second integrator means.

3. The invention as defined in claim 1 wherein said first and second integrator means have linear characteristics.

4. An analog comparator comprising:
a first integrator means having a first signal applied thereto and producing a first integrated output signal therefrom;
a second integrator means having a second signal applied thereto and producing a second integrated output signal therefrom;
differential amplifier means adapted to have said first and second output signals applied thereto for producing a differential output signal therefrom;
a threshold detector means responsive to a predetermined level of said first output signal and producing a sample signal therefrom;
means responsive to said sample signal for sampling said first and second output signals; and
means for holding the sampled values of said first and second output signals, and applying the same to said differential amplifier means.

5. The invention as defined in claim 4 including means for resetting said first and second integrator means at a predetermined rate.

6. The invention as defined in claim 1 including means for holding the sampled value of said differential output signal.

7. The invention as defined in claim 6 including, in addition, means for resetting said first and second integrator means following the holding of the sampled value of said differential output signal.

8. The invention as defined in claim 1 including means for providing a tolerance signal, and means for comparing the sampled value of said differential output signal with the value of said tolerance signal.

9. The invention as defined in claim 8 including, in addition, go, no go indicator means responsive to the compared condition between the sampled value of said differential output signal and the value of said tolerance signal.

10. The invention as defined in claim 9 including, in addition, means for holding the indication of said indicator means.

References Cited

UNITED STATES PATENTS

| | | | |
|---|---|---|---|
| 2,774,056 | 12/1956 | Strafford et al. | 340—149 |
| 2,840,308 | 6/1958 | Van Horne. | |
| 3,302,109 | 1/1967 | Jones | 340—149 XR |
| 3,175,212 | 3/1965 | Miller. | |
| 3,213,298 | 10/1965 | Luke | 328—146 XR |
| 3,358,231 | 12/1967 | Baganoff. | |
| 3,371,198 | 2/1968 | Greening | 340—149 XR |

DONALD J. YUSKO, Primary Examiner

U.S. Cl. X.R.

324—77

PO-1050
(5/69)

UNITED STATES PATENT OFFICE
CERTIFICATE OF CORRECTION

Patent No. 3,516,060 Dated June 2, 1970

Inventor(s) William C. Hutton and Robert C. Reibold

It is certified that error appears in the above-identified patent and that said Letters Patent are hereby corrected as shown below:

Column 9, line 15, "outpt" should read --output--. Column 11, line 52, "$R_1$" should read --R7--; and line 67, "poteniometer" should read --potentiometer--. Column 14, line 25, after the closing parenthesis ")" there should be inserted a comma --,--; line 26, "energized to" should read --energized, and the poles 198a and 198b are closed, to--; and line 69, "hte" should read --the--.

Signed and sealed this 8th day of May 1973.

(SEAL)
Attest:

EDWARD M.FLETCHER,JR.
Attesting Officer

ROBERT GOTTSCHALK
Commissioner of Patents